United States Patent
Brochard et al.

(10) Patent No.: US 11,511,875 B2
(45) Date of Patent: Nov. 29, 2022

(54) ACOUSTIC ABSORPTION STRUCTURE COMPRISING AT LEAST ONE ROTATIONALLY-INDEXED ACOUSTIC ELEMENT AND AIRCRAFT PROPULSION ASSEMBLY COMPRISING SAID ACOUSTIC ABSORPTION STRUCTURE

(71) Applicant: Airbus Operations S.A.S., Toulouse (FR)

(72) Inventors: Wolfgang Brochard, Carbonne (FR); Laurent Cazeaux, Toulouse (FR); Claire Maffre, Lias (FR)

(73) Assignee: Airbus Operations S.A.S.

( * ) Notice: Subject to any disclaimer, the term of this patent is extended or adjusted under 35 U.S.C. 154(b) by 578 days.

(21) Appl. No.: 16/682,252

(22) Filed: Nov. 13, 2019

(65) Prior Publication Data

US 2020/0164997 A1 May 28, 2020

(30) Foreign Application Priority Data

Nov. 28, 2018 (FR) ...................... 18 71981

(51) Int. Cl.
  *B64D 33/02* (2006.01)
  *G10K 11/168* (2006.01)
  *G10K 11/172* (2006.01)
  *B32B 3/30* (2006.01)

(52) U.S. Cl.
  CPC ............ *B64D 33/02* (2013.01); *G10K 11/168* (2013.01); *G10K 11/172* (2013.01); *B32B 3/30* (2013.01); *B32B 2307/102* (2013.01); *B32B 2605/18* (2013.01); *B64D 2033/0206* (2013.01)

(58) Field of Classification Search
  CPC ............ B64D 33/02; B64D 2033/0206; G10K 11/172; G10K 11/168; B32B 3/30; B32B 2307/102; B32B 2605/18
  See application file for complete search history.

(56) References Cited

U.S. PATENT DOCUMENTS

| 5,315,820 | A | 5/1994 | Arnold |
| 5,462,331 | A | 10/1995 | Stief et al. |
| 2013/0186707 | A1 | 7/2013 | Richter |

FOREIGN PATENT DOCUMENTS

| FR | 3055662 A1 | 3/2018 |
| RU | 179829 U1 | 5/2018 |

OTHER PUBLICATIONS

"Aero-acoustic liner applications of the broadband special acoustic absorber concept", American Institute of Aeronautics and Astronautics, AIAA 2013-2176, 19th AIAA/CEAS Aeroacoustics Conference, May 27-29, 2013, Berlin, Germany.
Anoshkin et al., Database WPI Week 201845 Thomson Scientific. London. GB; AN 2018-51480A XP002793287 (2017) & RU 179 829 U1 (Anoshkin A N) (May 25, 2018).
FR 18 71984 Search Report dated Jul. 30, 2019.
Co-pending U.S. Appl. No. 16/682,271, filed Nov. 13, 2019.

*Primary Examiner* — Forrest M Phillips
(74) *Attorney, Agent, or Firm* — Lerner, David, Littenberg, Krumholz & Mentlik, LLP

(57) ABSTRACT

An acoustic absorption structure includes: at least one acoustic element which has at least one cavity delimited by at least one enclosure comprising at least one first drainage orifice passing through the enclosure, and a rotational indexing system making it possible to position the acoustic element so that at least one first drainage orifice is positioned in proximity to or at a lowest point of the cavity. An aircraft propulsion assembly including such an acoustic absorption structure is also described.

12 Claims, 13 Drawing Sheets

[Figure 1]
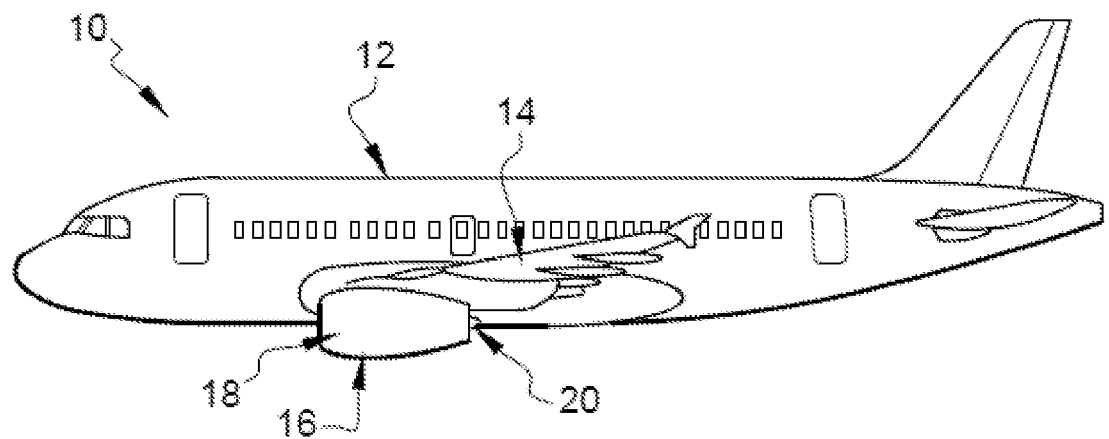

[Figure 2]
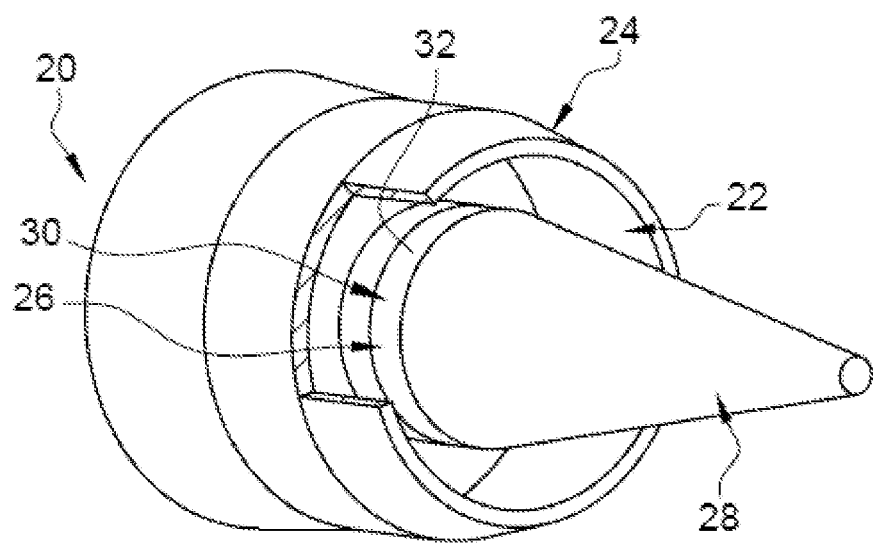

[Figure 3]
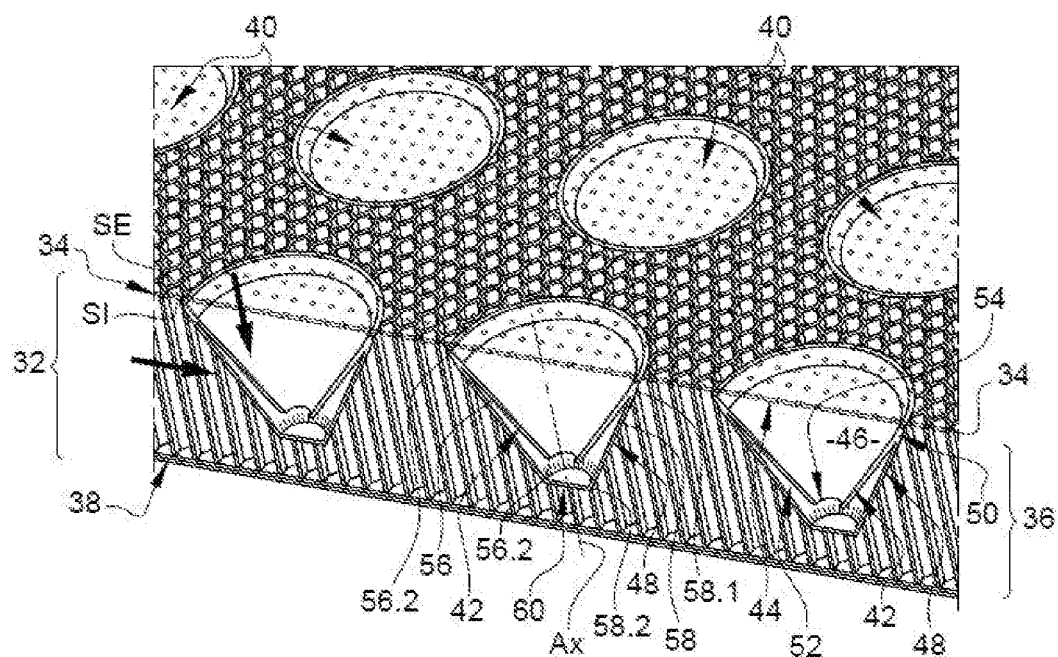

[Figure 4]
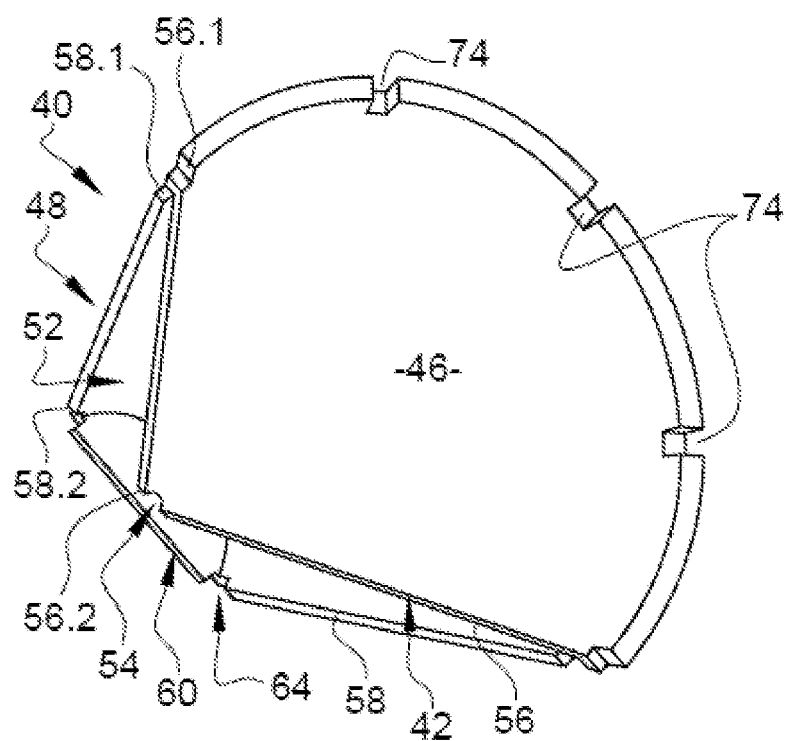

[Figure 5]
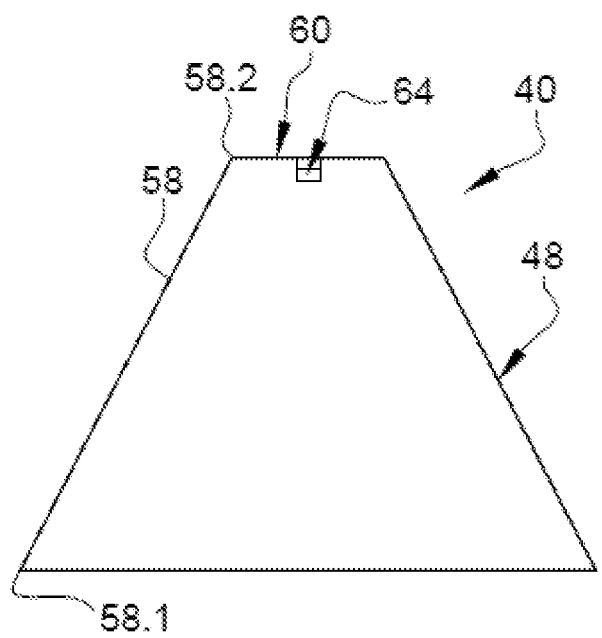

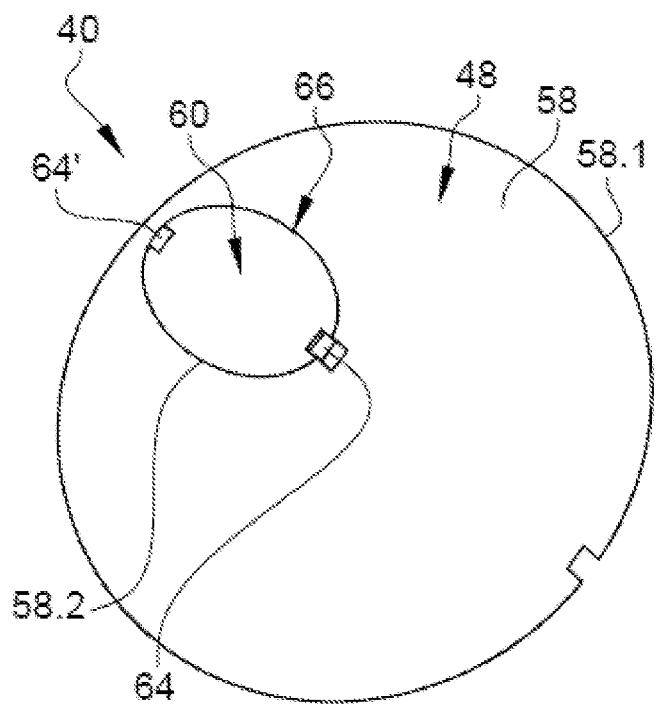
[Figure 6]

[Figure 7]
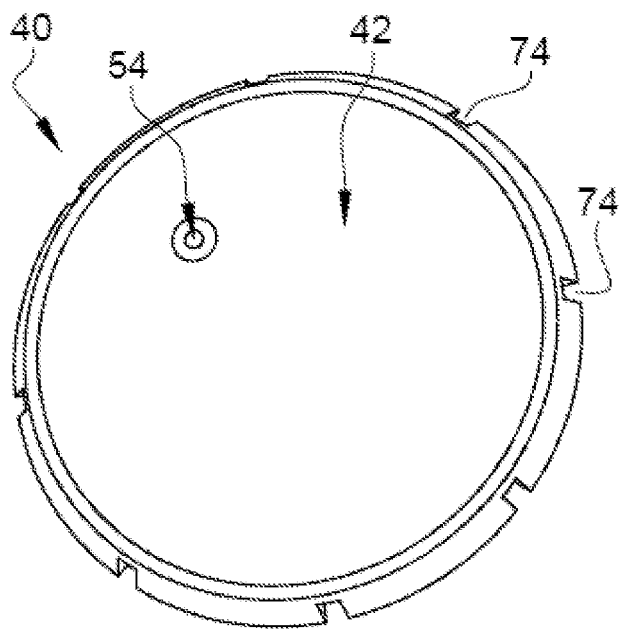

[Figure 8]
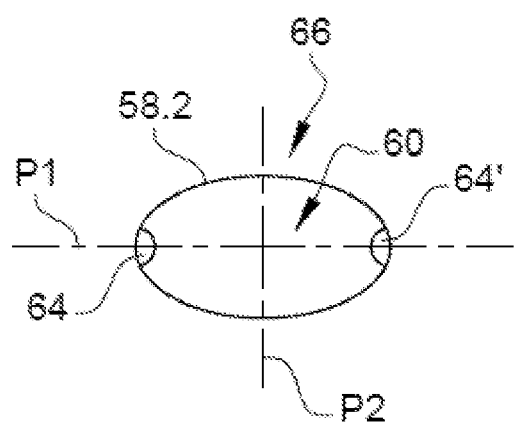

[Figure 9]
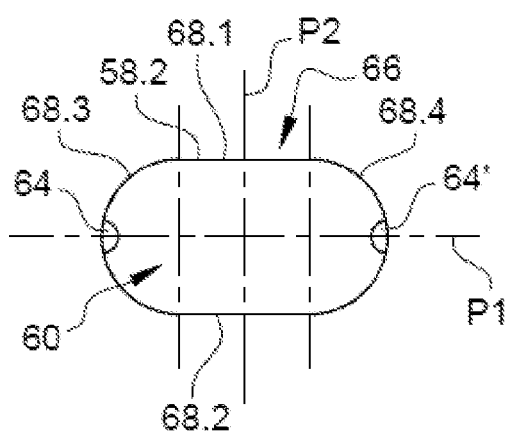

[Figure 10]
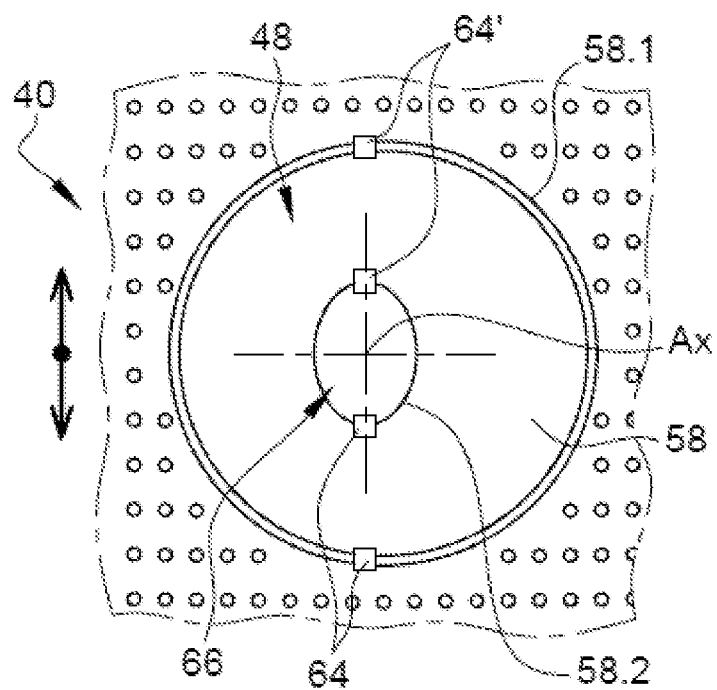

[Figure 11]
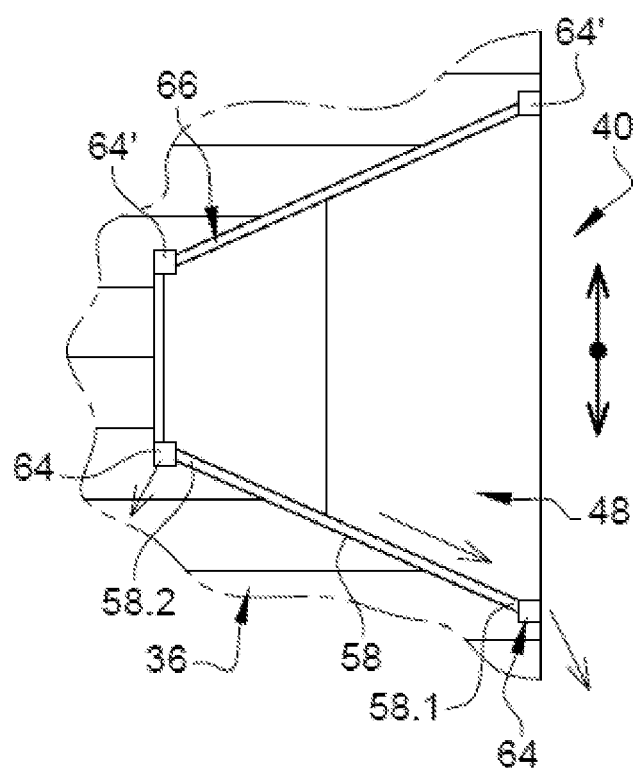

[Figure 12]
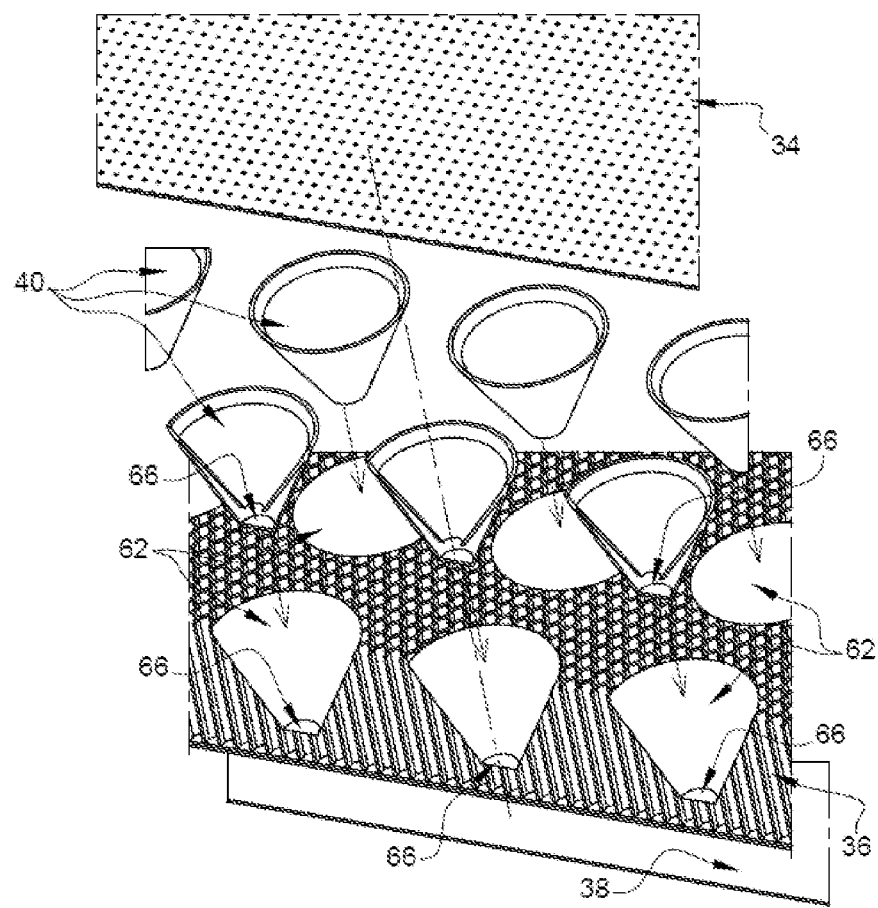

[Figure 13]
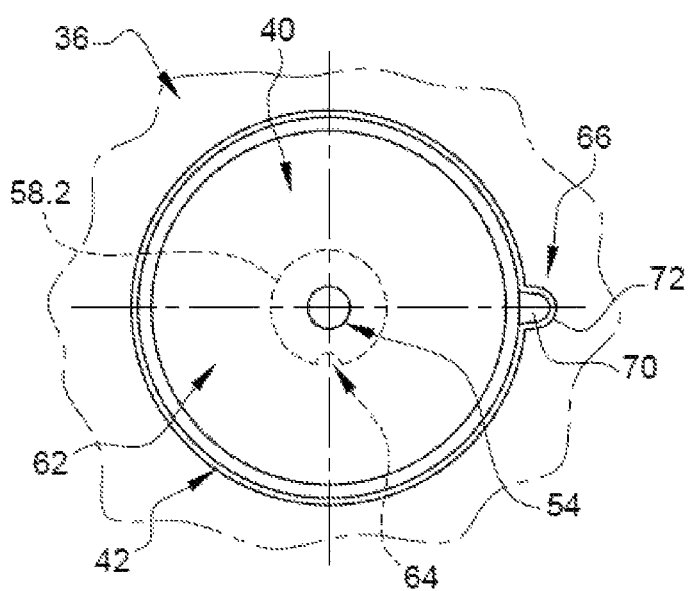

ACOUSTIC ABSORPTION STRUCTURE COMPRISING AT LEAST ONE ROTATIONALLY-INDEXED ACOUSTIC ELEMENT AND AIRCRAFT PROPULSION ASSEMBLY COMPRISING SAID ACOUSTIC ABSORPTION STRUCTURE

FIELD OF THE INVENTION

The present application relates to an acoustic absorption structure comprising at least one rotationally-indexed acoustic element and a propulsion assembly comprising such an acoustic absorption structure.

BACKGROUND OF THE INVENTION

According to an embodiment of the prior art, a propulsion assembly comprises a nacelle and a turbofan engine, positioned inside the nacelle. Some surfaces of the nacelle and of the turbofan engine comprise acoustic absorption structures for attenuating the sound nuisances. According to one embodiment, an acoustic absorption structure comprises a porous layer, a honeycomb cellular layer and a reflective layer.

An ultrahigh bypass ratio (UHBR) turbofan engine has a fan revolving at lower frequencies than some turbofan engines currently on the market so that the acoustic absorption structures have to be configured to attenuate low frequency soundwaves. To attenuate such soundwaves, the honeycomb cellular layer needs to have a significant height which is detrimental in terms of weight, of bulk and of production.

An acoustic absorption structure that makes it possible to absorb low frequency soundwaves is described in the document "aero-acoustic liner applications of the broadband special acoustic absorber concept, American Institute of Aeronautics and Astronautics, AIAA 2013-2176, 19th AIAA/CEAS Aeroacoustics Conference May 27-29, 2013, Berlin, Germany" It comprises a plurality of capsules sealed by a skin in contact with the medium in which the soundwaves are propagated so as to each delimit a cavity in which is positioned a hollow cone, remote from the capsule, which has a base emerging at the skin. Each cone comprises at least one acoustic orifice, making it possible to connect the interior of the cone with the space between the cone and the capsule, positioned and dimensioned as a function of the acoustic characteristics sought. In addition, the skin is porous at least in line with each cone.

A duly formed acoustic absorption structure, based on the same principle as a Helmholtz resonator and a quarter wave resonator, makes it possible to efficiently attenuate the low frequency sounds emitted by a turbofan engine of UHBR type.

Since the skin is porous in line with the cones and the latter are perforated, water or any other liquid can accumulate and stagnate, in operation, inside each cone and in the space delimited by each cone and its capsule. This accumulation of water or of liquid effects the correct operation of the acoustic absorption structure. Furthermore, in case of ice, the water transformed into ice can damage it.

BRIEF SUMMARY OF THE INVENTION

Aspects of the present invention may remedy all or some of the drawbacks of the prior art.

An embodiment of the invention is an acoustic absorption structure comprising:
an at least partially porous surface layer which has an outer surface and an inner layer opposite the outer surface,
a support layer linked to the surface layer,
at least one acoustic element, positioned in the support layer, which has at least one cavity delimited by at least one enclosure.

According to an embodiment of the invention, the acoustic absorption structure comprises a drainage system which comprises at least one first drainage orifice passing through the enclosure and a rotational indexing system making it possible to position the acoustic element in the support layer so that at least one first drainage orifice is positioned in proximity to or at a lowest point of the cavity.

By virtue of the rotational indexing system, at least one of the drainage orifices of the drainage system is positioned at a low point of the cavity greatly limiting the stagnation of liquid in said cavity.

According to another feature, the drainage system comprises at most two first diametrically opposite drainage orifices.

According to one embodiment, the rotational indexing system comprises, at the acoustic element, an outer lateral wall which is not of revolution and, at the support layer, an indentation for said acoustic element which has forms complementary or identical to those of the outer lateral wall of the acoustic element.

According to another feature, the outer lateral wall has two planes of symmetry and the drainage system comprises two first drainage orifices positioned with respect to the planes of symmetry so that one of the two first drainage orifices is positioned at or in proximity to the low point of the cavity when the acoustic element is in its indentation.

According to another feature, a straight line passing through the two first drainage orifices is contained in one of the planes of symmetry.

According to another feature, the outer lateral wall is tubular and delimited by a first edge, oriented towards the surface layer and describing a circle, and by a second edge, opposite the first edge, describing an ellipse.

According to another feature, the outer lateral wall is tubular and delimited by a first edge, oriented towards the surface layer and describing a circle, and by a second edge opposite the first edge describing an oblong form.

According to another embodiment, the rotational indexing system comprises a polarizing means, integral to the acoustic element, protruding with respect to an outer lateral wall, and a recess, hollowed out in the support layer, the polarizing means and the recess having complementary or identical forms so that the acoustic element can be positioned in its indentation only in a single position. In addition, the drainage system comprises a single drainage orifice positioned at or in proximity to a low point of the cavity when the polarizing means cooperates with the recess.

According to another feature, the acoustic element comprises:
a first enclosure, which has a first aperture pressed against the inner surface of the surface layer so that the first enclosure and the surface layer delimit a first cavity,
a second enclosure, in which is positioned the first enclosure, at least partially spaced apart from the first enclosure, which has a second aperture pressed against the first enclosure and/or possibly the inner surface so that the second enclosure and the first enclosure and possibly the surface layer delimit a second cavity,
at least one acoustic orifice passing through the first enclosure to connect the first and second cavities,
the first drainage orifice or orifices passing through the second enclosure.

According to another feature, the acoustic absorption structure comprises at least one second drainage orifice passing through the first enclosure.

According to another feature, each drainage orifice is positioned in the same radial plane as a first drainage orifice passing through the second enclosure.

Another embodiment of the invention is an aircraft propulsion assembly comprising at least one acoustic absorption structure according to one of the preceding features.

BRIEF DESCRIPTION OF THE DRAWINGS

Other features and advantages will emerge from the following description of the invention, the description being given solely by way of example, with respect to the attached drawings in which:

FIG. 1 is a side view of an aircraft,

FIG. 2 is a perspective view of a primary ejection duct comprising an acoustic absorption structure which illustrates an application of the invention, FIG. 3 is a perspective cross section of an acoustic absorption structure which illustrates an embodiment of the invention, FIG. 4 is a perspective cross section of an acoustic element of an acoustic absorption structure which illustrates a first embodiment of the invention, FIG. 5 is a side view of the acoustic element visible in FIG. 4, FIG. 6 is a perspective view of the bottom part of the acoustic element visible in FIG. 4, FIG. 7 is a perspective view of the top part of the acoustic element visible in FIG. 4, FIG. 8 is a view from below of a bottom wall of an acoustic element which illustrates the first embodiment of the invention, FIG. 9 is a view from below of a bottom wall of an acoustic element which illustrates a second embodiment of the invention, FIG. 10 is a view from below of an acoustic element correctly oriented in an acoustic absorption structure which illustrates an embodiment of the invention, FIG. 11 is a cross section of the acoustic element visible in FIG. 10 correctly oriented in an acoustic absorption structure, FIG. 12 is an exploded perspective view of the various elements of the acoustic absorption structure visible in FIG. 3, and FIG. 13 is a view from above of an acoustic element, equipped with a polarizing means, positioned in a cellular layer of an acoustic absorption structure which illustrates a third embodiment of the invention.

DETAILED DESCRIPTION

FIG. 1 shows an aircraft 10 which has a fuselage 12, two wings 14, arranged on either side of the fuselage 12, and propulsion assemblies 16 fixed under the wings 14. Each propulsion assembly 16 comprises a nacelle 18 and a turbofan engine 20 positioned inside the nacelle 18.

According to an embodiment visible in FIG. 2, the turbofan engine 20 comprises, at the rear, a primary ejection duct 22, through which gases burned in the turbofan engine 20 escape, which is delimited on the outside by a primary nozzle 24 and on the inside by an inner structure 26 extended by a nozzle cone 28.

According to one configuration, the inner structure 26 comprises an acoustic absorption structure 30, positioned at a skin 32, which delimits the primary ejection duct 22 and which has an outer surface SE, in contact with the burnt gases, and an inner surface SI, opposite the outer surface SE.

Although described as applied to a primary ejection duct 22, the invention is not limited to that application. Thus, the acoustic absorption structure 30 can be positioned at any skin 32 which has an outer skin SE in contact with a medium in which soundwaves are propagated, such as, for example, a lip and a duct of an air inlet of an aircraft nacelle, a fan casing of an aircraft nacelle or any other surface of the propulsion assembly 16. Thus, whatever the configuration, the propulsion assembly 16 comprises at least one acoustic absorption structure 30.

According to an embodiment visible in FIG. 3, the acoustic absorption structure 30 comprises a porous layer 34 of which one face forms the outer surface SE, at least one cellular layer 36, a reflective layer 38 and a plurality of acoustic elements 40, positioned in the cellular layer 36, which each have at least one cavity blocked off by the porous layer 34. According to one configuration, the cellular layer 36 is a honeycomb structure which has indentations 62 (visible in FIG. 12) for housing the acoustic elements 40.

According to the configurations, the porous layer 34 can be porous over all of its surface or comprise porous zones only in line with the acoustic elements 40.

Whatever the embodiment, the acoustic absorption structure 30 comprises:
  an at least partially porous surface layer 34 which has an outer surface SE in contact with a medium in which soundwaves are propagated and an inner layer SI, opposite the outer surface SE,
  a support layer 36, linked to the surface layer 34, which can be, in a non-exhaustive manner, a honeycomb cellular layer, a foam layer, or the like,
  at least one acoustic element 40, positioned in the support layer 36, which has at least one cavity connected with the medium in which the soundwaves are propagated.

According to an embodiment visible in FIG. 3, an acoustic element 40 comprises:
  a first indentation 42, also called cone, which has a first aperture 44 delimited by an edge pressed against the inner surface SI of the surface layer 34 so that the first enclosure 42 and the surface layer 34 delimit a first cavity 46 connected, via the porous surface layer 34, with the medium in which the soundwaves are propagated,
  a second enclosure 48, also called capsule, in which is positioned the first enclosure 42, at least partially spaced apart from the first enclosure 42, which has a second aperture 50 delimited by an edge pressed against the first enclosure 42 and/or possibly the inner surface SI of the surface layer 34 so that the second enclosure 48 and the first enclosure 42 (and possibly the surface layer 34) delimit a second cavity 52,
  at least one acoustic orifice 54 passing through the first enclosure 42 to connect the first and second cavities 46, 52.

According to an arrangement visible in FIG. 3, the acoustic elements 40 are arranged in several rows and several columns. Other arrangements could be envisaged.

According to an embodiment visible in FIGS. 3 and 4, the first enclosure 42 is tapered and comprises an inner lateral wall 56, delimited by a first edge 56.1, oriented towards the surface layer 34 and forming the first aperture 44, and by a second edge 56.2, opposite the first edge 56.1, which delimits the edge of the acoustic orifice 54.

According to one configuration, the first and second edges 56.1, 56.2 of the inner lateral wall 56 are approximately circular and the inner lateral wall 56 has an axis of revolution Ax.

Obviously, the invention is not limited to this geometry for the first enclosure 42. Thus, it can be tapered or cylindrical. It can comprise, in addition to the inner lateral wall 56, an inner bottom wall, to close the first cavity 42, positioned at the second edge 56.2 of the inner lateral wall 56. Depending on the configurations, the acoustic orifice or orifices 54 is (or are) positioned on the inner lateral wall 56 and/or onthe inner bottom wall.

According to an embodiment visible in FIGS. 3 to 6, the second enclosure 48 comprises an outer lateral wall 58, delimited by a first edge 58.1, oriented towards the surface layer 34 and forming the second aperture 50, and by a second edge 58.2 opposite the first edge 58.1, and an outer bottom wall 60 positioned at the second edge 58.2 of the outer lateral wall 58 so as to close the second cavity 52.

According to one configuration, the first edge 58.1 of the outer lateral wall 58 is approximately circular.

Whatever the geometry of the acoustic element 40, the support layer 36 comprises, for each acoustic element 40, an indentation 62 which has a form that makes it possible to house the acoustic element 40 so that the first aperture 44 of the first enclosure 42 is pressed against the surface layer 34. According to one configuration, the indentation 62 has a form complementary or identical to the outer lateral wall 58 of the second enclosure 48 of the acoustic element.

According to a feature of the invention, the acoustic element 40 comprises a drainage system to avoid the stagnation of a liquid inside at least one of the two cavities 46, 52.

The drainage system comprises at least one drainage orifice 64 passing through the second enclosure 48, positioned at or in proximity to the second edge 58.2 of the outer lateral wall 58. Depending on the embodiments, the drainage orifice 64 is positioned:

on the outer bottom wall 60 and in proximity to the second edge 58.2 of the outer lateral wall 58,
on the outer lateral wall 58, in proximity to the outer bottom wall 60 and the second edge 58.2, or
straddling the outer lateral wall 58 and the outer bottom wall 60, at the second edge 58.2.

According to a first embodiment visible in FIGS. 6, 8 to 11, the second enclosure 48 comprises two diametrically opposite drainage orifices 64, 64'. In this case, the acoustic element 40 must be correctly oriented for one of the two drainage orifices 64, 64' to be positioned at or in proximity to a low point of the second cavity 52 in order for the volume of liquid stagnating inside the second cavity 52 to be as small as possible. To this end, the acoustic absorption structure 30 comprises a rotational indexing system 66 configured to position the acoustic element 40 according to two given positions with respect to the support layer 36.

According to the first embodiment, the rotational indexing system 66 comprises, at the acoustic element 40, the outer lateral wall 58 of the second enclosure 48 which has two planes of symmetry P1 and P2 and, at the support layer 36, an indentation 62 which has forms complementary or identical to those of the outer lateral wall 58 of the second enclosure 48.

According to the first embodiment visible in particular in FIG. 8, the second edge 58.2 of the outer lateral wall 58 describes an ellipse and has two planes of symmetry P1 and P2.

According to a second embodiment visible in FIG. 9, the second edge 58.2 of the outer lateral wall 58 describes an oblong form which has two planes of symmetry P1 and P2 and comprises two rectilinear and parallel sections 68.1, 68.2 linked by two semi-circular sections 68.3, 68.4.

According to these two embodiments, the outer lateral wall 58 has a set tubular surface which bears at a first end on the first circular edge 58.1 and at a second end on the second edge 58.2. The outer lateral wall 58 is not of revolution.

According to these two embodiments, the two drainage orifices, 64, 64' are positioned with respect to the planes of symmetry of the outer lateral wall 58 of the second enclosure 48 so that one of the two drainage orifices 64, 64' is positioned at or in proximity to the low point of the second cavity 52 when the acoustic element is in its indentation 62.

According to one configuration, the straight line passing through the two drainage orifices 64, 64' is contained in one of the planes of symmetry of the outer lateral wall 58 of the second enclosure 48.

As illustrated in FIGS. 10 and 11, when the acoustic element 40 is in its indentation 62, one of the orifices 64, 64' is necessarily positioned at or in proximity to the lowest point of the second cavity 52 which makes it possible to prevent the accumulation of liquid in said second cavity 52.

According to a third embodiment visible in FIG. 13, the second enclosure 48 comprises a single drainage orifice 64. In this case, the acoustic element 40 must be correctly oriented for the single drainage orifice 64 to be positioned at or in proximity to a low point of the second cavity 52 in order for the volume of liquid stagnating inside the second cavity 52 to be as small as possible. To this end, the acoustic absorption structure 30 comprises a rotational indexing system 66 configured to position the acoustic element 40 according to a single given position with respect to the support layer 36.

According to the third embodiment visible in FIG. 13, the rotational indexing system 66 comprises a first form, called polarizing means 70, integral to the acoustic element 40, protruding with respect to the outer lateral wall 58, and a second form, called recess 72, hollowed out in the support layer 36, the polarizing means 70 and the recess 72 having complementary or identical forms so that the acoustic element 40 can be positioned in its indentation 62 only in a single position.

The polarizing means 70 and the single drainage orifice 64 are positioned so that, when the polarizing means 70 cooperates with its recess 72, the single drainage orifice 64 is positioned at or in proximity to a low point of the second cavity 52.

This third embodiment of the rotational indexing system can be used even if the outer lateral wall 58 of the second enclosure 48 has a form of revolution.

Whatever the embodiment, the second enclosure comprises a smaller number of drainage orifices 64, 64', at most two. This limited number of drainage orifices 64, 64' makes it possible to limit the impact of the drainage orifices on the acoustic efficiencies of the acoustic element 40.

Generally, the liquids present in the first cavity 46 can flow through the porous surface layer 34 in line with the first cavity 46 and/or via the acoustic orifice 54.

In certain circumstances, the acoustic element 40 comprises at least one drainage orifice 74 passing through the first enclosure 42. The drainage orifice or orifices 74 is (or are) positioned at or in proximity to the first edge 56.1 and/or the second edge 56.1 of the inner lateral wall 56 of the first enclosure 42. According to a first configuration visible in FIG. 4, a plurality of drainage orifices 74 are positioned on the periphery of the inner lateral wall 56. According to another configuration visible in FIGS. 10 and 11, each drainage orifice 74 is positioned in the same radial plane (plane passing through the axis of revolution Ax) as a drainage orifice 64, 64' passing through the second enclosure 48. Thus, when the acoustic element 40 is in its indentation 62, at least one of the drainage orifices 74 passing through the first enclosure 42 is positioned at or in proximity to the lowest point of the first cavity 46.

Whatever the embodiment, the drainage system comprises at least one drainage orifice 64, 64', 74 passing through the first and/or the second enclosure 42, 48 and a rotational indexing system 66 that makes it possible to rotationally immobilize the acoustic element 40 in the enclosure 62 of the support layer 36 so that at least one drainage orifice 64, 64', 74 is positioned in proximity to or at a lowest point of the first and/or second cavity 46, 52. The low point of a cavity extends from a point of the cavity to which a fluid flows by virtue of gravity.

The drainage system comprises, at one and the same enclosure, at most two drainage orifices 64, 64', 74 so as not to excessively impact the operation of the acoustic element.

When the drainage system comprises at least one pair of first and second drainage orifices 64, 74 each passing through a first and second enclosure 42, 48, the first and second drainage orifices 64, 74 of one and the same pair are arranged in one and the same radial plane.

Whatever the embodiment, by virtue of the rotational indexing system, at least one of the drainage orifices 64, 74 of the drainage system is positioned at a low point of the first and/or second cavity 46, 52 greatly limiting the stagnation of liquid in said first and/or second cavity 46, 52.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic absorption structure comprising:
    an at least partially porous surface layer having an outer surface and an inner surface opposite the outer surface;
    a support layer linked to the surface layer;
    at least one acoustic element, positioned in the support layer having at least one cavity delimited by at least one enclosure,
    wherein the acoustic absorption structure comprises a drainage system comprising at least one first drainage orifice passing through the enclosure and a rotational indexing system making it possible to position the acoustic element in the support layer so that at least one first drainage orifice is positioned in proximity to or at a lowest point of the cavity.

2. The acoustic absorption structure according to claim 1, wherein the drainage system comprises at most two first diametrically opposite drainage orifices.

3. The acoustic absorption structure according to claim 2, wherein the rotational indexing system comprises, at the acoustic element, an outer lateral wall which is not of revolution and, at the support layer, an indentation for said acoustic element, the indentation having forms complementary or identical to those of the outer lateral wall of the acoustic element.

4. The acoustic absorption structure according to claim 3, wherein the outer lateral wall has two planes of symmetry (P1, P2), and
    wherein the at least one first drainage orifice comprises two first drainage orifices positioned with respect to the planes of symmetry so that one of the two first drainage orifices is positioned at or in proximity to the low point of the cavity when the acoustic element is in its indentation.

5. The acoustic absorption structure according to claim 4, wherein a straight line passing through the two first drainage orifices is contained in one of the planes of symmetry.

6. The acoustic absorption structure according to claim 4, wherein the outer lateral wall is tubular and delimited by a first edge, oriented towards the surface layer and describing a circle, and by a second edge opposite the first edge describing an ellipse form.

7. The acoustic absorption structure according to claim 4, wherein the outer lateral wall is tubular and delimited by a first edge, oriented towards the surface layer and describing a circle, and by a second edge opposite the first edge describing an oblong form.

8. The acoustic absorption structure according to claim 1, wherein the rotational indexing system comprises a polarizing means, integral to the acoustic element, protruding with respect to an outer lateral wall, and a recess, hollowed out in the support layer, the polarizing means and the recess having complementary or identical forms so that the acoustic element is positioned in its indentation only in a single position and wherein the drainage system comprises a single drainage orifice positioned at or in proximity to a low point of the cavity when the polarizing means cooperates with the recess.

9. The acoustic absorption structure according to claim 1, wherein the acoustic element comprises:
    a first enclosure having a first aperture pressed against the inner surface of the surface layer so that the first enclosure and the surface layer delimit a first cavity;
    a second enclosure, in which is positioned the first enclosure, at least partially spaced apart from the first enclosure, and having a second aperture pressed against the first enclosure and/or the inner surface so that some or all of the second enclosure and the first enclosure and the surface layer delimit a second cavity;
    at least one acoustic orifice passing through the first enclosure to connect the first and second cavities; and
    wherein the at least one first drainage orifice pass through the second enclosure.

10. The acoustic absorption structure according to claim 9, further comprising at least one second drainage orifice passing through the first enclosure.

11. The acoustic absorption structure according to claim 10, wherein each of the at least one second drainage orifice is positioned in the same radial plane as one of the at least one first drainage orifice passing through the second enclosure.

12. An aircraft propulsion assembly comprising at least one acoustic absorption structure according to claim 1.

* * * * *